United States Patent [19]

Knudsen et al.

[11] Patent Number: 4,895,628

[45] Date of Patent: Jan. 23, 1990

[54] PROCESS FOR THE PREPARATION OF SUBMICRON-SIZED BORON CARBIDE POWDERS

[75] Inventors: Arne K. Knudsen; Charles A. Langhoff, both of Midland, Mich.

[73] Assignee: The Dow Chemical Company, Midland, Mich.

[21] Appl. No.: 889,665

[22] Filed: Jul. 28, 1986

Related U.S. Application Data

[63] Continuation-in-part of Ser. No. 700,841, Feb. 12, 1985.

[51] Int. Cl.$^4$ .............................................. C01B 35/00
[52] U.S. Cl. ......................... 204/157.41; 204/157.45; 204/157.47
[58] Field of Search ...................... 204/157.41, 157.45, 204/157.47; 423/291

[56] References Cited

U.S. PATENT DOCUMENTS

| | | | |
|---|---|---|---|
| 4,080,431 | 3/1978 | Moss | 423/289 |
| 4,343,687 | 8/1982 | Ronn | 204/157.41 |
| 4,558,017 | 12/1985 | Gupta et al. | 204/157.41 |

FOREIGN PATENT DOCUMENTS 0124901 11/1984 European Pat. Off. ........ 204/157.41

OTHER PUBLICATIONS

J. D. Casey and J. S. Haggerty, J. Mat. Sci., 22, (1987), pp. 737-744.
R. A. Marra and J. S. Haggerty, Ceram. Eng. Sci. Proc. 3, (1982).
I. M. MacKinnon and B. G. Reuben, J. Electrochem. Sco. 122 (6) (1975).
J. K. McDonald, L. C. Warren, and J. A. Merritt, Technical Report RR-81-2, (available from DTIC #A101035).
B. Schramm, "Laser induced process in molecules", (K. Kompa and S. D. Smith, Editors, Springer-Verlag Pub.), ppg. 274-276 (1979).
J. Phys. and Chem. Solids, Suppl. No. 1, 229 (1967).
J. T. Yardley and A. Gupta, paper presented at Electro Optics Laser International Japan 1984m Tokyo, Japan (Feb. 16-18, 1984).
S. Mierzejewska et al., J. Less Common Metals, 8, 368-374 (1965).
W. R. Cannon et al., J. Am. Ceram. Soc., 65 (7) 324 (1982).
W. R. Cannon et al., J. Am. Ceram. Soc., 65 (7) 330 (1982).
F. H. Flint et al., Proc. SPIE, 458, 108 (1984).
N. V. Karlov et al., JETP Lett. 11, 135 (1970).
S. D. Rockwood et al., Chem. Phys. Lett. 34, 542 (1975).
G. A. Tanton et al., C. A. 87 209259g (1977).
Inone Japax Res. Inc. Der. 06,532, [JP-062251 (1980)].
Kernforchungs Julich Der. 28,858 [DE-0371 99 (1980)].
Kernforchungs Julich Der. 37, 134 [DE-139270 (1983)].
Kernforchungs Julich Der. 55,264 [DE-046801 (1982)].
Kernforchungs Julich Der. 79,310 [DE-108266 (1982)].
Emerson Elec. Co. Der. 92,997 [USA-832555 (1977)].
Westinghouse Elec. Corp. Der. 84-1270994/22 [U.S.A. 418,941 (1984)].
V. N. Sazonov et al., Kvantovaya Elektron. (Moscow) 10(5), 1043 (1983)m CA 100: 148357d.
F.B.T. Pessine et al., Acta Sud Am. Quim. 1(1), 19-33 (1981), CA 96: 208244x.
JETP Lett., 14, 214 (1971).
S. V. Volkov et al., Ukr. Khim. Zh. 48(5), 451 (1982), CA 97:48679h.
R. A. Marra and J. S. Haggerty, Ceram. Eng. Sci. Proc. 3,3 (1982).
J. T. Yardley and A. Gupta, Lecture, Electro Optics/Laser International, Tokyo, Japan, Feg. 16-18 (1984).

*Primary Examiner*—John F. Niebling
*Assistant Examiner*—Ben C. Hsing
*Attorney, Agent, or Firm*—Barbara J. Sutherland

[57] ABSTRACT

Ultrafine, high purity $B_4C$ is produced by $BCl_3$, $CH_4$ or $C_2H_4$, and $H_2$, using a $CO_2$ laser, when a stoichiometric excess of $H_2$ and about half the stoichiometric amount of $CH_4$ or $C_2H_4$ is employed.

14 Claims, 1 Drawing Sheet

PROCESS FOR THE PREPARATION OF SUBMICRON-SIZED BORON CARBIDE POWDERS

CROSS-REFERENCE TO RELATED APPLICATION

This application is a continuation-in-part of the copending application Ser. No. 700,841, filed Feb. 12, 1985.

BACKGROUND OF THE INVENTION

The present invention concerns an improved process for the preparation of ultrafine high purity boron carbide powders, and its product, useful as a relatively high cost refractory material in the manufacture of ceramic parts.

A significant impediment to the increased use of ceramic materials in certain applications is the high incidence of failures in engineered ceramic parts. These failures can often be attributed to small cracks or voids in such parts, which result from incomplete packing of the precursor powders. An obvious solution to this problem is the manufacture of ultrafine monodispersed powders which can be packed tightly, thereby reducing the void spaces between particles.

Current efforts in ceramic technology are directed toward the manufacture of ceramic parts &hat exhibit the desirable physical properties of the material, e.g., hardness, maintenance of structural integrity at high temperatures, and chemical inertness, with the elimination of impurities and defects which often result in failure of the ceramic. It has been suggested, E.A. Barringer and H. K. Bowen, "Formation, Packing and Sintering of Monodispersed $TiO_2$ Powders," *J. Amer. Ceram. Soc.* Vol. 65, C-199 (1982), that an "ideal" ceramic powder for producing a high quality part must be of high purity and contain particles which are monodispersed, spherical, nonagglomerated and of a fine size (0.1–1.0 micron).

As a ceramic powder is sintered, adjacent particles fuse into grains. In general, the grain size is governed by the particle size of the powder from which the part is prepared. In other words, the grain size is necessarily larger than the crystallites from which a part is sintered. Thus, the sintering of finer particles presents the opportunity to produce fine-grained bodies.

The effect of grain size on the integrity of boron carbide bodies has been investigated by A. D. Osipov, I. T. Ostapenko, V. V. Slezov, R. V. Tarasov, V. P. Podtykan and N. F. Kartsev, "Effect of Porosity and Grain Size on the Mechanical Properties of Hot-Pressed Boron Carbide," *Sov. Powder Metall. Met. Ceram.* (Engl. Transl.) 21(1), 55–8 (1982). The authors found that parts exhibiting a fine grain size were significantly stronger than parts consisting of coarse grains.

An additional advantage in the use of ceramic powders with a small average particle size is that the temperatures required to sinter the powders are often reduced. In their work on sintering $TiO_2$ powders, Barringer and Bowen found that the sintering temperature could be reduced from 1,300°–1,400° C. to 800° C. when using 0.08 micron sized particles. On an industrial scale, this could result in a considerable savings both in material and energy costs.

The gas-phase synthesis of boron carbide powders typically involves the reaction of a boron halide with a hydrocarbon as the carbon source in the presence of hydrogen. I. M. MacKinnon and B. G. Reuben, "The Synthesis of Boron Carbide in an RF Plasma," *J. Electrochem. Soc.* 122(6), 806 (1975), utilize a radio-frequency induced argon plasma to heat a stream of boron trichloride, methane and hydrogen. The boron carbide powders formed are about 200–300 Å in diameter. British Patent No. 1,069,78 and U.S. Pat. No. 3,340,020 describe the reaction of boron trichloride-methane mixtures in a hydrogen plasma jet to produce boron carbide powders of 200 Å average particle size.

The synthesis of ceramic powders using a carbon dioxide laser was first developed by Haggerty and co-workers. In their article, "Synthesis and Characteristics of Ceramic Powders Made from Laser-Heated Gases," *Ceram. Eng. Sci. Proc.* Vol. 3, 31 (1982), R. A. Marra and J. S. Haggerty describe the preparation of silicon, silicon carbide and silicon nitride powder from $SiH_4$. The powders produced were quite small, equiaxed, and monodispersed with particle sizes in the range of 100–1,000 Å. Their paper also contains the statement that this laser-heated process can be used to produce other nonoxide ceramics such as $TiB_2$, AlN and $B_4C$ as well as many oxide ceramics. However, there is no specific teaching regarding the actual production of $B_4C$ using a laser.

The printed version of a talk given at Electro Optics/Laser International, Japan, 1984, Feb. 16–18, 1984, by J. T. Yardley and A. Gupta, entitled "Production of Light Olefins from Synthesis Gas Using Catalysts Prepared by Laser Pyrolysis," reports the successful preparation of boron carbide from boron trichloride, hydrogen and ethylene using a continuous wave $CO_2$ laser.

One example in the literature, a technical report from the U. S. Army Missile Command, government access number AD-A101035, investigated the possibility that a $CO_2$ laser could be used as an energy source for the reaction of boron trichloride and a hydrocarbon to produce boron carbide. However, the investigation did not produce boron carbide ($B_4C$).

Unexpectedly, it has now been found that a $CO_2$ laser is an acceptable energy source for the reaction of boron trichloride, hydrogen and a hydrocarbon for the production of high purity boron carbide but only under certain reaction conditions.

Several commercial uses are available for ultrafine high purity boron carbide powders and ceramics made from such powders, for example, sand blasting nozzles, seals, abrasive powder for grinding/machining applications, and as sintering aids.

The present invention provides a process for the preparation of high purity ultrafine boron carbide powder. Also, the present process produces relatively monodispersed ultrahigh purity boron carbide powders.

According to this invention, ultrafine high purity boron carbide powder is produced by subjecting a continuous stream of reactant gases consisting essentially of a volatile boron source, less than the stoichiometric amount, calculated on the boron in the boron source, of a volatile carbon source and at least a stoichiometric amount, calculated on the boron in the boron source, of a source of hydrogen, at an absolute pressure of at least about 300 Torr, to an amount of $CO_2$ laser radiation effective to convert at least a portion of the volatile boron source to $B_4C$.

This invention also concerns the boron carbide powder product prepared by the present process. The product ($B_4C$) powder has several unique properties compared to known $B_4C$ powders. For example, the present $B_4C$ powder can be hot-pressed to parts of theoretical density at temperatures substantially below those required for conventionally prepared $B_4C$ powders. Also, the microstructure of the pressed parts reveals pure, uniform grains, which are required in high strength ceramic parts. Thus this invention also concerns boron carbide having the following characteristics:

(a) B/C ratio of 3.9 to 4.2;
(b) metal impurities of less than 10 ppm per metal;
(c) particle size range of 100 to 1300 Å;
(d) monodispersed powder;
(e) surface area of at least 50 $m^2/g$;
(f) microcrystalline structure; and
(g) capable of being densified to theoretical density (2.52 $g/cm^3$).

In the accompanying drawings, the preferred apparatus and one aspect of the product is shown.

BRIEF DESCRIPTION OF THE DRAWINGS

FIG. 3 is a photomicrograph of boron carbide powder produced in Run 52 of Example B (Magnified 54,000X).

DESCRIPTION OF THE PREFERRED EMBODIMENTS

As used herein the term "ultrahigh purity" refers to $B_4C$ which is at least 99 percent pure.

The term "high purity" means $B_4C$ which is at least about 94 percent pure.

The term "a source of hydrogen" means a source capable of releasing hydrogen, such as in reaction with the volatile boron and carbon sources or when subjected to heat.

The term "ultrafine particle" means particles having a diameter of less than 1 μm.

The term "volatile boron source" means a boron-containing material which is gaseous at the temperature at which the material is injected into the reactant stream. Typically volatile boron sources for use in the present process include absorbing boron sources such as, trimethyl borate. Other volatile boron sources include alkyl borons, such as trimethyl boron, alkyl borates, such as trimethyl borate, boron hydrides, such as diborane, and boron halides, such as boron trifluoride. A preferred boron source is boron trichloride.

The term "reactant gases" means the gases which are employed, because of their carbon, boron and/or hydrogen content, to form $B_4C$ when subjected to low power laser irradiation.

The gas phase laser synthesis of boron carbide from a volatile boron source, for instance, boron trichloride, hydrogen and a volatile carbon source which is gaseous at the temperature of the gaseous mixture, for instance, ethylene or methane, is induced by the absorption of photons at 10.6 microns (both boron trichloride and ethylene absorb strongly in this region). The overall stoichiometry is illustrated by means of the equations:

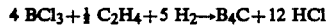

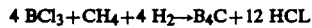

Both reactions are endothermic: $\Delta H^0$ using ethylene as the carbon source is +90.6 kcal/mol and $\Delta H^0$ using methane is +114.8 kcal/mole. We have found that the aforesaid reactions, when initiated with a $CO_2$ laser and conducted under the conditions described hereinafter, will produce high purity or ultrahigh purity $B_4C$ in good yield.

Figure 1:
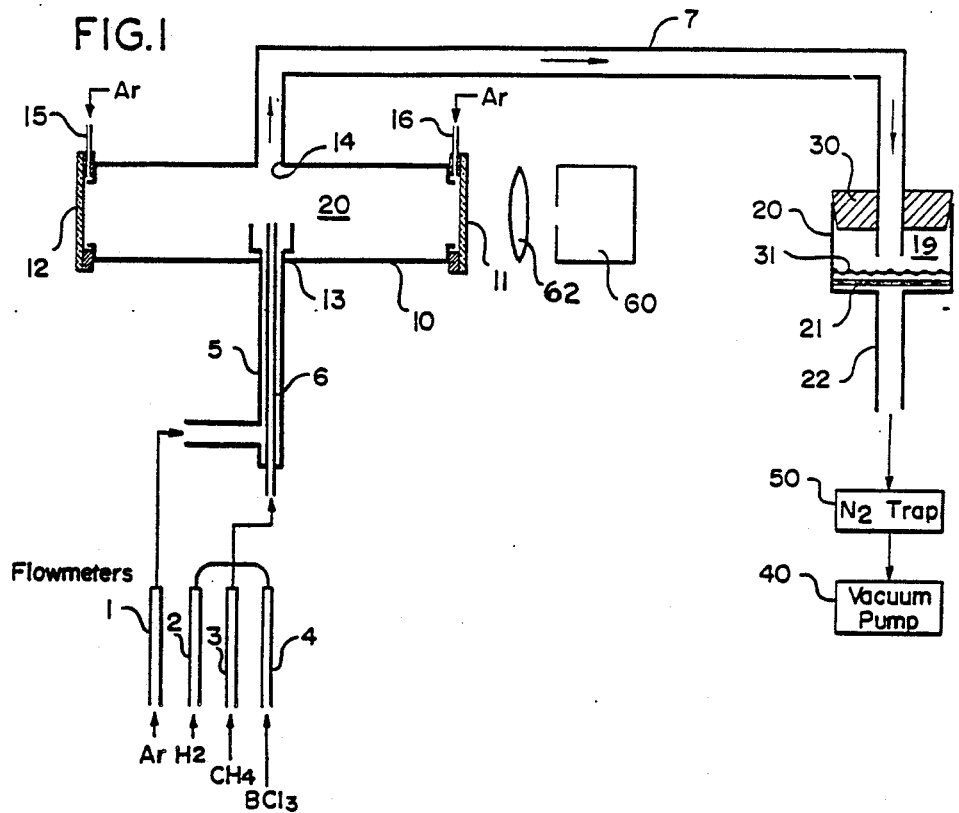
FIG. 1 is a schematic drawing of apparatus suitable for practicing the process of the invention.

A reactor suitable for effecting the reaction is illustrated schematically in FIG. 1. The reactor proper is a cylindrical Pyrex glass tube or reactor 10 with KCl windows 11 and 12 firmly attached at either end. The reactor has a centrally located entrance port 13 and a centrally located exit port 14 positioned opposite entrance port 13. A glass inlet tube 5 is fitted in gas tight connection in entrance port 13 and to the argon source 1. A smaller gas inlet tube 6 is mounted concentrically in inlet tube 5 with an open end thereof extending into reactor 10 and the other end in gas tight connection with the source of reaction gases. One end of a gas outlet tube 7 is mounted in gas tight connection to exit port 14 and the other is fitted in gas tight connection into the top of a Pyrex Buchner funnel 20, which has a glass frit filter 21 and a collection tube 22, by a rubber stopper 30. Smaller gas inlet ports 15 and 16 are located proximate the KCl windows 11 and 12. The reactor is designed to inhibit the $B_4C$ solids formed from adhering to the inside of the reactor and/or fusing together to form larger agglomerates.

It should be noted that other reactors can be used within the scope and teachings of the instant invention, for instance, a reactor with germanium or zinc selenide windows would be acceptable.

An argon gas purge is introduced proximate each window via ports 15 and 16 and also concentric to the reactant gas stream via tube 1 and inner tube 6 into entrance port 13. The window purge serves to prevent both window overheating and the accumulation of material on the window surfaces. The concentric flow of argon serves to entrain the boron carbide particles in the gas stream as they are formed.

The reactant gases, $H_2$, $BCl_3$, and $CH_4$ or $C_2H_4$ are introduced into reactor 10 through aluminum tubes 2, 4 and 3, respectively. All gas flow rates are monitored with gas flow controllers. A typical gas flow meter can be a calibrated Matheson flow meter. The reactant gases are premixed prior to entering the reactor via the inner tube of entrance port 13. Boron carbide powder entrained in the gas stream leaves the reactor via exit port 14, travels through gas outlet tube 7 and is collected on a filtration device 19, for instance, one comprising a filter paper disc 31 mounted on the glass filter 21 (40–60 micron pore size of Buchner funnel 20). Gases leave the system via collection tube 22, which is connected in gas tight connection to a Leybold-Heraeus corrosive gas vacuum pump 40 which is protected by a liquid nitrogen trap 50 which traps condensible materials. An inert fluorocarbon pump oil is used in the pump to prevent gross oil decomposition. The pressure within the reactor is monitored by a conventional Bourdon gauge (not shown) and is regulated by regulating both gas input flow rate and vacuum pumping rate.

In alternative embodiments, no vacuum pump is necessary. Further, a gas scrubber can be in fluid communication with the vacuum pump. Alternatively, the scrubber can be in direct connection with the filtration device to eliminate undesirable materials from the gas stream.

In the embodiment of the drawing, the output of a $CO_2$ laser 60 100W cw (Coherent model 40), operating multimode at 10.6 microns at a power of about 80 watts, is focused at about 1-10 kw/cm² into the set of reactant gases entering the reactor 10. The beam travels through the front KCl window 11 and out the rear KCl window 12. An AR-coated germanium lens 62 with a 200 mm focal length is used to focus the beam. However, a defocused beam is used; that is, the beam is focused so that the focal point of the beam is located either in front of or behind the flame produced where the laser beam intersects the gaseous mixture (boron carbide powder nucleates and forms in the flame). For this lens, the preferred distance between the combustion nozzle formed by the open end of inlet tube 6 projecting into entrance port 13 and the laser focal point is about 3 cm. The size of the laser spot where it impacts the reactant gases is preferably the same diameter as the diameter of the reactant gas stream, however the diameter of the laser spot can be less than the diameter of the reactant gas stream or alternatively, greater than the diameter of the reactant gas stream.

In alternative embodiments, the power of the laser could be increased, operating at up to 25 kw. Alternatively, a low power laser, at less than 25 watts could be used, e.g., 10 watts. With these lasers, the reactor 10 and accompanying optics, such as the lens 62, mirrors and windows 11 and 12, would require some modifications known to one skilled in the art.

The yield and purity of the $B_4C$ obtained in the process of this invention is determined by a number of interrelated process variables.

The purity of $B_4C$ obtained is significantly affected by the ratio of hydrocarbon to boron source in the starting gas mixture particularly when using conventional low power lasers, e.g., about 25 watts. Ordinarily, that ratio is less and desirably substantially less than stoichiometric, i.e., up to about 60 percent thereof. Conversely, too little of the carbon source can lower purity and, of course, yield. Therefore, from about 20 percent to 60 percent, preferably about 40 percent to 60 percent, and most preferably about 50 percent of the stoichiometric amount of the carbon source, calculated on the boron source in the starting gas mixture, is employed. However, the adverse effect of an amount of carbon source in the reaction gas mixture in excess of about 60 percent of stoichiometric can be compensated for at least partially by using a higher powered laser. With higher powered lasers, up to about stoichiometric amounts of the carbon source can probably be employed without seriously affecting the purity of the $B_4C$ produced.

Too little $H_2$ also adversely affects purity. Therefore, at least the stoichiometric amount of hydrogen which would be required if all of the boron source reacted is preferably employed, e.g., from about 100 percent to 1,000 percent, preferably about 200 percent to 800 percent, and more preferably about 300 percent to 800 percent of the stoichiometric amount of $H_2$ is employed.

The power of the laser affects yield and, as noted above, can also affect purity. Laser powers of from about 25 watts have utility. However, powers of greater than 25 watts are preferred.

The laser spot size near the reactant nozzle also affects yield and can affect purity. The distance between the focusing lens and the reactant gas stream is fixed such that the laser spot size is comparable to the diameter of the reactant gas stream.

The pressure at which the reaction is conducted also can affect purity and/or yield. A pressure of about 300 to 1,500 Torr and most preferably about 600 to 700 Torr is therefore employed. The optimal pressure above 600 Torr is determined by the desired particle size of the boron carbide powder produced. A pressure of about 600 Torr is preferred for the synthesis of 200-300 Å boron carbide particles.

The use of an inert gas diluent, e.g., argon or helium, in the stream of reactant gases is desirable but need be present only when apparatus considerations require it.

Although methane and ethylene are the preferred carbon sources for the reaction, any carbon source which is gaseous at the temperature at which it is mixed with the $BCl_3$ and $H_2$ can be employed. Thus, although volatile hydrocarbons, e.g., methane, ethane, ethylene, isooctane, acetylene and butylene are preferred, contemplated equivalents are other volatile carbon sources which contain another element, e.g., chlorine or nitrogen, e.g., volatile halocarbons, provided they react comparably to the corresponding hydrocarbon. However, some carbon sources are more sensitive than others to the reaction conditions required to produce high purity $B_4C$ therefrom. Preferably, the carbon source comprises a member of the group consisting of methane, ethylene and carbon tetrachloride.

Alternatively to the use of $BCl_3$ as the sole boron source, a volatile boron source can be used in conjunction with boron trichloride or either an absorbing hydrocarbon, such as ethylene, or an absorbing boron source, such as trimethyl borate. Other volatile boron sources include alkyl borons, such as trimethyl borate, boron hydrides, such as diborane, and boron halides, such as boron trifluoride. Preferably, the boron source comprises a member of the group of an alkyl boron, an alkyl borate, a boron hydride or a boron halide.

Because the reaction is endothermic, lower laser power is required if the starting gaseous mixture is heated, e.g., up to about 1,400° C. (but below the temperature at which the stream of reactant gases react in the absence of laser energy).

Because a stoichiometric excess of $BCl_3$ is employed, the unreacted $BCl_3$ is preferably recycled to the reactor, after separation of the HCl therefrom in any conventional manner. By using a continuous belt filter, an electrostatic precipitator or cyclone to collect the $B_4C$, the reaction can be conducted continuously, thereby ensuring steady state conditions.

The $B_4C$ produced according to the process of this invention is very pure, i.e., it contains preferably less than 6 percent, more preferably less than 1 percent, and most preferably less than 0.1 percent each of elemental carbon and boron. The $B_4C$ produced has extremely fine particles, for example, ranging from about 100 to 1,300 Å.

The following is the procedure employed in a typical run using the process of this invention. These examples are intended only to illustrate the invention, but not to limit the scope of the invention or claims.

EXAMPLE 1

Using a new, preweighed filter paper disk and washed Buchner funnel, the reactor system was evacuated (ultimate vacuum about 0.1 Torr). Argon flow at a rate of 750 cms/min was started. Immediately thereafter, the $CH_4$, $BCl_3$ and $H_2$ flows were started at rates of approximately 5.0, 40 and 200 cms/min, respectively. (Typical flow rates with ethylene are $BCl_3/H_2/C_2H_4=40/100/2.5$ cm³/min). Through regulation of the pumping valve, the reactor pressure was fixed at approximately 600 Torr. The laser beam was then allowed to enter the cell with the concomitant appearance of a luminescent flame. Greyish particles of $B_4C$ immediately began to appear on the filter paper. It was usually necessary to increase the vacuum pumping rate once the reaction was initiated. After a predetermined period of time (typically 15 min), the laser beam was blocked off and the reactant flow halted. The reactor was again evacuated after which it was opened to the air and the filter paper and product were weighed. The weight of product per mole of $BCl_3$ introduced into the reactor was then used as a quantitative measure of reaction efficiency. Ideally, the collection system is maintained under an inert atmosphere, to reduce the adsorption of oxygen on the $B_4C$ particles.

A. Using Ethylene as the Carbon Source

The results obtained using ethylene as the carbon source are summarized in Table IA. The gas flow rates listed for Ar, $BCl_3$, $H_2$ and $C_2H_4$ are all in $cm^3/min$. Laser power refers to the power transmitted through the reactor during the synthesis. The presence of carbon and boron impurities in the $B_4C$ is qualitatively evidenced by a color change. A laser synthesized $B_4C$ with excess carbon tends to be black, while a laser synthesized $B_4C$ with excess boron tends to be brown. Ultrafine, high purity $B_4C$ powders tend to be gray.

Figure 2:
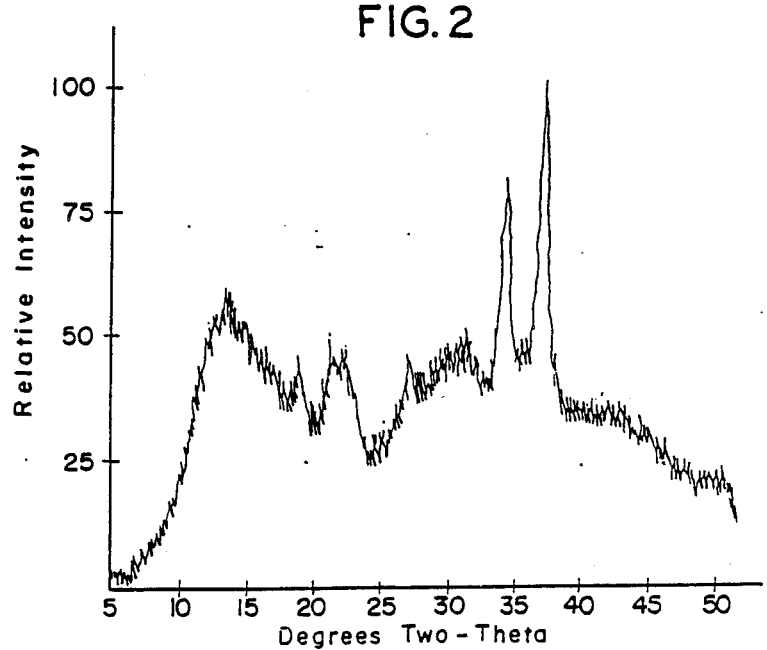
FIG. 2 is the x-ray diffraction pattern of boron carbide obtained by the process of the invention.

In Runs 11 and 12, the ethylene flow was half of the calculated stoichiometric amount. The product analyzed as 21.4±2.3 weight percent C. (The theoretical amount of C in pure $B_4C$ is 21.7 percent.) The x-ray diffraction pattern of the product is shown in FIG. 2. The peaks at scattering angles of 19.3, 21.8, 22.8, 31.8, 34.7 and 37.4 degrees two-theta (Cu source, $\lambda=1.5418$ Å) correspond in both position and intensity to the strongest $B_4C$ peaks at 19.8 22.1, 23.5, 31.9, 34.9 and 37.8 degrees two-theta. An electron micrograph of the boron carbide particles obtained indicated that their particle sizes ranged from about 100 to about 1,000 Å with the majority of particles being about 500 Å in diameter.

The weight of powder collected relative to the boron chloride charge to the reactor is independent of ethylene concentration in the concentration ranges studied. However, product purity is strongly dependent on the $BCl_3/C_2H_4$ ratio. At an 8:1 gas volume ratio (corresponding to stoichiometric) the product is grayish-black, indicative of an amorphous carbon impurity. As the $BCl_3/C_2H_4$ ratio is increased from 8 to 16, the color of the sample changes from gray-black to gray. Use of an amount of ethylene up to about half the stoichiometric amount results in boron carbide product of good purity.

While an acceptable boron carbide powder is obtained using stoichiometric amounts of hydrogen, a purer product (again as indicated by its color) results when excess hydrogen is present.

The yield and purity of product increases with increasing laser power. When lower powers are used, the product contains a substantial carbon impurity. Accordingly, operation at 50W incident radiation or above is preferred.

B. Using Methane as the Carbon Source

Using procedures similar to those described in part A above, boron carbide powders are prepared using methane as the carbon source. The results are summarized in Table IB. Study of an electron micrograph of the powder obtained in Run 42, showed the particle size to be in the range 100–400 Å and that the average particle size was 200–300 Å. The product was again characterized by x-ray diffraction.

In Runs 34–36, the concentration of methane was systematically varied. As in example A, the apparent yield of powder remained constant while the amount of free carbon impurity increased with increasing methane concentration relative to boron trichloride. A methane flow of up to one-half of the calculated stoichiometric amount gives good quality product, using a 100 W laser.

Increasing the flow rate of hydrogen relative to boron trichloride was again beneficial. The product purity and yield increased.

Optimal pressure in the reactor for the production of particles with diameters between 200 and 300 Å ranges from about 600–700 Torr. Increasing amounts of carbon are formed as the pressure is lowered further. As noted previously, pressure within the reactor is controlled both by controlling the flow rate of the reactants and by controlling the vacuum applied to the reactor.

The effects of laser intensity and point of laser focus are quite similar to those effects observed in Example A. As the laser spot diameter approached the diameter of the reactant stream corresponding to a position 30 mm in front of the sample nozzle, product yield increased. Similarly, as incident laser power was increased, product yield also increased.

The quantum yield for the boron carbide synthesis, i.e., molecules of boron carbide per photon absorbed, can be estimated from the weight of recovered product and the laser power absorbed. Using Run 51 as a typical run, a 48 percent yield of boron carbide at 9W power absorbed, the quantum yield is 0.001. This value corresponds to 240 photons per boron carbide molecule. The $\Delta H$ values for the reactions shown above correspond to 34 (ethylene) and 42 (methane) photons. As noted previously, the yield of boron carbide obtained depends on the incident laser intensity. In addition, a laser spot diameter substantially similar to the diameter of the stream of reactant gases favors higher yields. The power densities in the focused and slightly defocused configurations were approximately 10 kw/$cm^2$ and 1.5 kw/$cm^2$, respectively, at 80W incident power. If one extrapolates yield vs. laser power employed in this example, incident laser intensity of about 340W should give a 100 percent yield.

The synthesis of boron carbide powers using a laser as the energy source presents a number of advantages over conventional synthesis. The reliability and versatility of $CO_2$ lasers used in industry is well established. These lasers, when used in conjunction with the present invention, provide a means for producing $B_4C$ on a continuous basis.

TABLE IA

| Boron Carbide Laser Synthesis - $BCl_3/C_2H_4/H_2$ | | | | | | |
|---|---|---|---|---|---|---|
| Run | AR[1] | $BCl_3$[1] | $H_2$[1] | $C_2H_4$[1] | Laser Power[2] | Focus[3] | Percent Yield |
| 11 & 12 | 750 | 40 | 100 | 2.5 | — | 0 | 25.6 |
| 13 | 750 | 40 | 100 | 3.75 | 60 | 0 | 24 |
| 14 | 400 | 40 | 100 | 2.5 | 54 | 0 | 22.8 |
| 15 | 300 | 40 | 100 | 3.0 | 50 | 0 | 25.9 |
| 17 | 300 | 40 | 100 | 3.0 | 52 | 0 | 28.4 |
| 18 | 300 | 40 | 50 | 3.0 | 50 | 0 | 21.4 |
| 19 | 300 | 40 | 150 | 3.0 | 49 | 0 | 24.5 |
| 20 | 750 | 40 | 150 | 4.0 | 55 | 0 | 24.6 |
| 21 | 750 | 60 | 150 | 4.0 | 59 | 0 | 19.5 |
| 22 | 300 | 30 | 100 | 2.5 | 54 | 0 | 24.2 |
| 23 | 750 | 40 | 100 | 2.5 | 61 | 0 | 28.4 |
| 24 | 750 | 40 | 100 | 2.5 | 51 | 0 | 23.0 |

TABLE IA-continued
Boron Carbide Laser Synthesis - BCl$_3$/C$_2$H$_4$/H$_2$

| Run | AR[1] | BCl$_3$[1] | H$_2$[1] | C$_2$H$_4$[1] | Laser Power[2] | Focus[3] | Percent Yield[4] |
|---|---|---|---|---|---|---|---|
| 25 | 750 | 40 | 100 | 2.5 | 39 | 0 | 17.9 |
| 26 | 750 | 40 | 100 | 2.5 | 32 | 0 | 12.4 |
| 27 | 750 | 40 | 100 | 2.5 | 16 | 0 | 4.3 |
| 28 | 750 | 40 | 100 | 2.5 | 66 | 20 | 32.8 |
| 29 | 750 | 40 | 100 | 2.5 | 62 | 30 | >34 |
| 30 | 750 | 40 | 100 | 2.5 | 61 | 40 | 31.0 |
| 31 | 750 | 40 | 100 | 3.75 | 61 | 30 | 38.4 |

[1]Flow rates in cm$^3$/min.
[2]Transmitted laser power, in watts.
[3]Distance between gas inlet nozzel axis and focal point, in mm.
[4]Based on BCl$_3$ introduced into reactor.

TABLE IB
Boron Carbide Laser Synthesis - BCl$_3$/CH$_4$/H$_2$

| Run | AR[1] | BCl$_3$[1] | H$_2$[1] | CH$_4$[1] | Laser Power[2] | Focus[3] | Percent Yield[4] |
|---|---|---|---|---|---|---|---|
| 33 | 750 | 40 | 100 | 5.0 | 69 | 0 | 24.4 |
| 34 | 750 | 40 | 100 | 5.0 | 65 | 30 | 33.3 |
| 35 | 750 | 40 | 100 | 7.5 | 63 | 30 | 35.5 |
| 36 | 750 | 40 | 100 | 10.0 | 63 | 30 | 34.9 |
| 37 | 750 | 40 | 20 | 5.0 | 62 | 30 | 24.2 |
| 38 | 750 | 40 | 30 | 5.0 | 60 | 30 | 26.2 |
| 39 | 750 | 40 | 40 | 5.0 | 62 | 30 | 20.4 |
| 40 | 750 | 40 | 60 | 5.0 | 60 | 30 | 24.7 |
| 41 | 750 | 60 | 150 | 5.0 | 62 | 30 | 38.2 |
| 42 | 750 | 40 | 200 | 5.0 | 62 | 30 | 41.6 |
| 44 | 750 | 40 | 200 | 5.0 | 66 | 30 | 29.3 |
| 45 | 750 | 40 | 200 | 5.0 | 47 | 30 | 32.0 |
| 46 | 750 | 40 | 200 | 5.0 | 47 | 30 | 34.4 |
| 47 | 750 | 40 | 200 | 5.0 | 38 | 30 | 30.5 |
| 48 | 750 | 40 | 200 | 5.0 | 25 | 30 | 20.2 |
| 49 | 750 | 40 | 200 | 5.0 | 11 | 30 | 6.4 |
| 50 | 750 | 40 | 200 | 5.0 | 65 | 30 | 27.3 |
| 51 | 750 | 40 | 200 | 5.0 | N/A | 30 | 48.3 |
| 52 | 750 | 60 | 150 | 7.5 | N/A | 30 | 42.9 |

[1]Flow rates in cm$^3$/min.
[2]Transmitted laser power, in watts.
[3]Distance between gas inlet nozzel axis and focal point, in mm.
[4]Based on BCl$_3$ introduced into reactor.

With BCl$_3$/CH$_4$/H$_2$ flow rates of 60/7.5/150 cm$^3$/min, respectively, (Run 52 of Table IB) B$_4$C powder was collected for a period of 276 min. The yield of product, B$_4$C, was 4.02 g, which corresponds to a conversion efficiency of 42.9 percent based on the BCl$_3$ added and 85.8 percent based on the CH$_4$ added. This conversion efficiency is typical of the present process.

The preceding Examples A and B can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

EXAMPLE 2

The following Table II details the effect of laser power and reactant concentration on the average particle diameter, <d>. In general, decreasing the laser power leads to decreasing <d> at the expense of conversion efficiency and purity using both CH$_4$ and C$_2$H$_4$ as carbon sources.

The experiment was run on the same equipment shown in FIG. 1 and in a manner analogous to Example 1. The <d> was measured from transmission electron micrographs of the powders.

TABLE II

| Run | AR[1] | Laser Power[2] | H$_2$/BCl$_3$ | B/C ratio | <d>[3] |
|---|---|---|---|---|---|
| 23 | 750 | 61 | | 16 (C$_2$H$_4$) | 440 |
| 24 | 750 | 51 | | 16 | 320 |
| 26 | 750 | 32 | | 16 | 180 |
| 27 | 750 | 16 | | 16 | 190 |
| 42 | 750 | 66 | | 8 (CH$_4$) | 200 |
| 47 | 750 | 38 | | 8 | 190 |
| 48 | 750 | 25 | | 8 | 190 |
| 49 | 750 | 11 | | 8 | 150 |
| 33 | 750 | 69 | | 8 (CH$_4$) | 260 |
| 34 | 750 | 65 | | 8 | 300 |
| 35 | 750 | 63 | | 5.3 | 195 |
| 36 | 750 | 63 | | 4 | 130 |
| 37 | 750 | 62 | 0.5 | 8 (CH$_4$) | 270 |
| 38 | 750 | 60 | 0.75 | 8 | 325 |
| 39 | 750 | 62 | 1.0 | 8 | 375 |
| 40 | 750 | 60 | 1.5 | 8 | 300 |
| 42 | 750 | 62 | 5 | 8 | 200 |

[1]Flow rates in cm$^3$/min.
[2]Transmitted laser power, in watts.
[3]Measured in Å.

EXAMPLE 3

The properties of the B$_4$C powder prepared by the present process and the properties of commercially available B$_4$C powders are shown in Table IV. The powders produced by the present process are ultrafine, equiaxed and monodispersed.

TABLE III

| | Example | | | | |
|---|---|---|---|---|---|
| | 1 | A | B | C | D |
| B (W Percent) | 76.8 | 77.9 | 76.1 | 75.5 | 76.2 |
| C (W Percent) | 20.7 | 19.6 | 20.6 | 21.1 | 22.5 |
| B/C | 4.1 | 4.4 | 4.1 | 4.0 | 3.8 |
| Fe (ppm) | 6 | 530 | 400 | — | — |
| Ca (ppm) | ND | 410 | 300 | — | — |
| Cr (ppm) | ND | — | ND | — | — |
| Ni (ppm) | ND | — | ND | — | — |
| Mg (ppm) | ND | — | — | — | — |
| O (W Percent) | 0.86 | 0.65 | 1.76 | 2.10 | — |
| N (W Percent) | 0.01 | 0.92 | 0.10 | 0.08 | — |
| Other (W Percent) | 0.76 (Cl) | — | 0.12 (Ti) | — | — |
| Particle Size (μm)[1] | 0.043 | 0.74 | 0.23 | 0.039 | — |
| Particle Size (μm)[2] | 0.035 | — | — | 0.030 | — |
| Surface Area (m$^2$/g)[3] | 55.4 | 3.2 | 10.2 | 60.3 | — |
| Crystal Structure | B$_4$C | B$_4$C | B$_4$C | Amorphous | B$_4$C |

[1]Determined from surface area measurements
[2]Determined by SEM/TEM
[3]BET method
ND means not detectable
Example 1 is a product of this invention
Example A is ESK 1200 from Elektroschmelzwerk Kempten GmbH
Example B is ESK 1500 from Elektroschmelzwerk Kempten GmbH
Example C is from Callery Chemical Co.
Example D is Norbide from Norton.

EXAMPLE 4

Of primary importance to the ultimate usefulness of any ceramic powder is its densification characteristics. In general, B$_4$C is hot pressed at about 5,000 psi and 2,200° C. The B$_4$C of the present invention has been densified at temperatures significantly below those reported in the literature. In Table IV are summarized some properties of hot pressed B$_4$C powders of the present invention and commercially available powders, all pressed at 2,200° C.

TABLE IV

| | Examples | | | |
|---|---|---|---|---|
| | 1 | A | B | C |
| B (W Percent) | — | 77.9 | 77.8 | 77.2 |
| C (W Percent) | — | 20.2 | 21.0 | 21.4 |
| O (W Percent) | — | 0.29 | 0.16 | 0.06 |
| N (W Percent) | — | 0.29 | 0.16 | 0.35 |
| B/C | — | 4.28 | 4.12 | 4.01 |
| Density (g/cm$^3$) | 2.52 | 2.52 | 2.50 | 2.48 |
| Hardness H$_y$ (kg/mm$^2$, 1,000 g load) | 3200 | 3030 | 3320 | 2650 |
| Hardness H$_y$ (kg/mm$^2$, 100 g load) | 3800 | 3470 | 3725 | 3562 |
| Fracture toughness (K$_{1C}$, MPam$^{-3/2}$)[1] | 3.7 | 3.51 | 3.06 | — |

[1]Indentation method
Example 1 is a product of this invention
Example A is ESK 1200 from Elektroschmelzwerk Kempten GmbH
Example B is ESK 1500 from Elektroschmelzwerk Kempten GmbH
Example C is from Callery Chemical Co.

What is claimed is:

1. An endothermic process for the preparation of ultrafine high purity boron carbide powder, which comprises subjecting a continuous stream of a reactant gas mixture consisting essentially of; (1) volatile boron chloride source and; (2) up to a stoichimetric amount, calculated on the boron in the boron chloride source, of a volatile carbon source; (3) at least a stoichimetric amount, calculated on the boron in the boron chloride source, of a source of hydrogen, at an absolute pressure of at least about 300 Torr, to an amount of CO$_2$ laser radiation effective to convert at least a portion of the volatile boron chloride source to B$_4$C.

2. The process according to claim 1 wherein the boron chloride source is boron trichloride.

3. A process according to claim 2 wherein up to about 50 percent of the stoichimetric amount, calculated on the BCl$_3$, of a carbon source is present.

4. The process according to claim 3 wherein the carbon source is present in the reactant starting gas mixture in an amount from about 20 percent to about 60 percent of the stoichiometric amount, calculated on the BCl$_3$ in the reactant gas mixture; wherein the hydrogen is present in 100 percent to 1,000 percent of stoichiometric amount, calculated on the BCl$_3$ in the reactant gas mixture; wherein the reaction is conducted at a pressure of about 300 to 1,500 Torr; and wherein the carbon source is methane or ethylene.

5. The process according to claim 4 wherein the carbon source is present in an amount from about 40 percent to 60 percent of the stoichiometric amount; wherein the hydrogen is present in 200 to 800 percent; and wherein the reaction is conducted at a pressure of about 600–700 Torr.

6. The process according to claim 5 wherein the hydrogen is present in 300 percent to 400 percent of the stoichiometric amount.

7. The process according to claim 1 wherein the carbon source is present in the starting gas mixture in an amount from about 40 percent to 60 percent of the stoichiometric amount, calculated on the boron in the boron chloride source, in the reactant gas mixture.

8. The process according to claim 7 wherein hydrogen is present in the reactant gas mixture from about 300 to 400 percent of the stoichiometric amount, calculated on the boron in the boron chloride source in the reactant gas mixture.

9. The process according to claim 1 wherein the carbon source is volatile hydrocarbons or volatile halocarbons.

10. The process according to claim 9 wherein the carbon source is methane, ethylene, carbon tetrachloride or mixtures thereof.

11. The process according to claim 10 wherein the carbon source is methane.

12. The process according to claim 1 wherein the CO$_2$ laser provides a power of at least about 10 watts.

13. The process according to claim 1 wherein the reaction is conducted at a pressure of about 300 to 1,500 Torr.

14. The process according to claim 13 wherein the reaction is conducted at a pressure of 600–700 Torr.

* * * * *

UNITED STATES PATENT AND TRADEMARK OFFICE
CERTIFICATE OF CORRECTION

PATENT NO. : 4,895,628                                    Page 1 of 2

DATED     : January 23, 1990

INVENTOR(S) : Arne K. Knudsen and Charles A. Langhoff

It is certified that error appears in the above-identified patent and that said Letters Patent is hereby corrected as shown below:

Column 1, line 28 please delete "&hat" and insert -- that --.

Column 2, line 7 please delete "1,069,78" and insert -- 1,069,748 --.

Column 5, line 1 please delete "1-10 kw/cmz into the set" and insert -- 1-10 kw/cm$^2$ into the jet --.

Column 5, line 55 please delete "800" and insert -- 400 --.

Column 6, line 62 please delete "cms/min" and insert -- cm$^3$/min --.

Column 6, line 64 please delete "cms/min" and insert -- cm$^3$/min --.

Column 8, line 33 please delete "0.001" and insert -- 0.0041 --.

Column 9, line 40 please delete "BCl$_3$/CH$_4$/H$_2$flow" and insert -- BCl$_3$/CH$_4$/H$_2$ flow --.

Column 11, line 23 please delete "(1)" and insert -- (1) a --.

Column 11, line 24 please delete "and; (2) up to a" and insert -- ; (2) up to the --.

Column 11, line 26 please delete "source;" and insert -- source and; --.

UNITED STATES PATENT AND TRADEMARK OFFICE
CERTIFICATE OF CORRECTION

PATENT NO. : 4,895,628

DATED : January 23, 1990

INVENTOR(S) : Arne K. Knudsen and Charles A. Langhoff

It is certified that error appears in the above-identified patent and that said Letters Patent is hereby corrected as shown below:

Column 11, line 39 please delete "starting".

Signed and Sealed this

Twenty-third Day of July, 1991

Attest:

*Attesting Officer*

HARRY F. MANBECK, JR.

*Commissioner of Patents and Trademarks*